(12) United States Patent
Ide et al.

(10) Patent No.: US 7,911,921 B2
(45) Date of Patent: Mar. 22, 2011

(54) DIFFRACTION OPTICAL ELEMENT, MOLDING DIE FOR THE OPTICAL ELEMENT AND MANUFACTURING METHOD THEREOF

(75) Inventors: Hideki Ide, Yokohama (JP); Masahiro Uekita, Yokohama (JP); Eijiro Koike, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 451 days.

(21) Appl. No.: 12/175,557

(22) Filed: Jul. 18, 2008

(65) Prior Publication Data
US 2009/0022036 A1 Jan. 22, 2009

(30) Foreign Application Priority Data
Jul. 20, 2007 (JP) ................ P2007-189944

(51) Int. Cl.
*G11B 7/00* (2006.01)

(52) U.S. Cl. ........... 369/112.03; 369/112.04; 369/112.1; 369/44.12

(58) Field of Classification Search ........... None
See application file for complete search history.

(56) References Cited

U.S. PATENT DOCUMENTS

| 6,097,863 A * | 8/2000 | Chowdhury ............ 385/37 |
| 7,315,419 B2 * | 1/2008 | Taira et al. ............ 359/569 |
| 2001/0038503 A1 | 11/2001 | Nakai |

FOREIGN PATENT DOCUMENTS

JP 2002-189114 7/2002

* cited by examiner

*Primary Examiner* — Muhammad N Edun
(74) *Attorney, Agent, or Firm* — Oblon, Spivak, McClelland, Maier & Neustadt, L.L.P.

(57) ABSTRACT

A diffraction optical element is provided to reduce harmful lights and also suppress deterioration in the optical characteristics of the element. The diffraction optical element 22 is formed with a plurality of diffraction gratings 17', 18', 19' and 20'. From these diffraction gratings, there are selected the diffraction gratings 18', 19' and 20' whose groove apex angles are less than a predetermined angle. The diffraction gratings 18', 19' and 20' has chamfer surfaces 18c', 19c' and 20c' formed on the lower side of respective slanted surfaces 18a', 19a' and 20a'. The chamfer surfaces 18c', 19c' and 20c' are slanted to the slanted surfaces 18a', 19a' and 20a', respectively.

8 Claims, 9 Drawing Sheets

DIFFRACTION OPTICAL ELEMENT, MOLDING DIE FOR THE OPTICAL ELEMENT AND MANUFACTURING METHOD THEREOF

BACKGROUND OF THE INVENTION

1. Field of the Invention

The present invention relates to a diffraction optical element, a molding die for the diffraction optical element and a manufacturing method of the molding die.

2. Description of the Related Art

Recently, with enhanced requirement for high performance and miniaturization in optical systems, a diffraction optical element has been getting people's attention. More particularly, a diffraction optical element whose diffraction gratings have a blazed profile (i.e. saw-tooth appearance) in section is frequently utilized in an optical system of an optical equipment since such a diffraction optical element is low in profile and high in diffraction efficiency.

Japanese Patent Publication Laid-open No. 2002-189114 discloses a method of manufacturing such a diffraction optical element. In accordance with the disclosed manufacturing method, the diffraction optical element is produced by using plastic material and a molding die in which a number of inverse-shaped grooves are formed to have an inverse profile to the diffraction gratings by cutting operation.

SUMMARY OF THE INVENTION

As mentioned above, in manufacturing a molding die for molding a diffraction optical element, a number of grooves having a profile corresponding to the diffraction gratings are formed in a die material by cutting. However, it should be noted that there is a possibility of occurrence of a burr at a point of the groove in cutting in the die material. This burr becomes easier to be produced as an inclination angle of the groove gets larger.

In a diffraction optical element manufactured by using the above molding die with burrs, consequently, harmful light is produced due to diffuse reflection at the element's portions molded corresponding to the burrs, causing the optical characteristics of the element itself to be reduced disadvantageously.

Under such a situation, an object of the present invention is to provide a diffraction optical element capable of reducing harmful lights and also suppressing deterioration in the optical characteristics of the element. Another object of the present invention is to provide a molding die for the diffraction optical element and a manufacturing method of the molding die.

In order to attain the former object, according to the present invention, there is provided a diffraction optical element comprising: a plurality of diffraction gratings formed to have a blazed profile in section, each of the diffraction gratings being defined by a slanted surface of one diffraction grating and a side surface of another diffraction grating adjacent to the diffraction grating, wherein in the diffraction gratings, at least one diffraction grating that an angle of a slanted surface of the at least one diffraction grating with a side surface of another diffraction grating adjacent to the at least one diffraction grating is less than a predetermined angle, is provided with a chamfer surface which is formed on the lower side of the slanted surface and also inclined to the slanted surface.

In order to attain the latter object, according to the present invention, there is also provided a molding die for molding a diffraction optical element having a plurality of diffraction gratings formed to have a blazed profile in section, the molding die comprising: a plurality of grooves formed to correspond to the diffraction gratings and also have a blazed profile in section, each of the grooves being defined by a slanted surface of one groove and a side surface of another groove adjacent to the one groove, wherein in the grooves, at least one groove that an angle of a slanted surface of the at least one groove with a side surface of another groove adjacent to the at least one groove is less than a predetermined angle, is provided with a chamfer surface which is formed on the upper side of the slanted surface and also inclined to the slanted surface.

Still further, according to the present invention, there is also provided a method of manufacturing a molding die for molding a diffraction optical element having a plurality of diffraction gratings formed to have a blazed profile in section, the molding die having a plurality of grooves formed to correspond to the diffraction gratings of the diffraction optical element and also have a blazed profile in section, the method comprising the steps of: preparing a die material; forming V-shaped grooves at predetermined positions on a surface of the die material, each of the V-shaped grooves having a V-shaped section; cutting a lower side of one slanted surface defining each of the V-shaped grooves thereby to form a side surface of each of the grooves, which intersects with the one slanted surface of the V-shaped groove and which is substantially perpendicular to the surface of the die material; and cutting in another slanted surface defining each of the V-shaped grooves thereby to form a slanted surface of each of the grooves, which intersects with the side surface and which extends in an opposite direction to the one slanted surface of the V-shaped groove intersecting with the side surface; wherein in case of forming the groove that an angle of the side surface with the slanted surface is less than a predetermined angle, the step of cutting in the other slanted surface to form the slanted surface including a step of shaving a top end of a slanted surface of another V-shaped groove adjoining the upper end of the slanted surface at thereby to form a chamfer surface intersecting with the slanted surface obliquely.

DETAILED DESCRIPTION OF THE PREFERRED EMBODIMENTS

A preferred embodiment of the present invention will be described with reference to attached drawings.

First, we now explain a situation of occurrence of burrs on a molding die when cutting grooves corresponding to the profile of a diffraction optical element with reference to FIGS. 1 to 5. In an example shown in FIGS. 1 to 5, it is noted that a die base (base material) made from appropriate steel for molding dies is adopted as a material for the molding die and that an electroless nickel plating is applied on the die base.

Figure 1A:
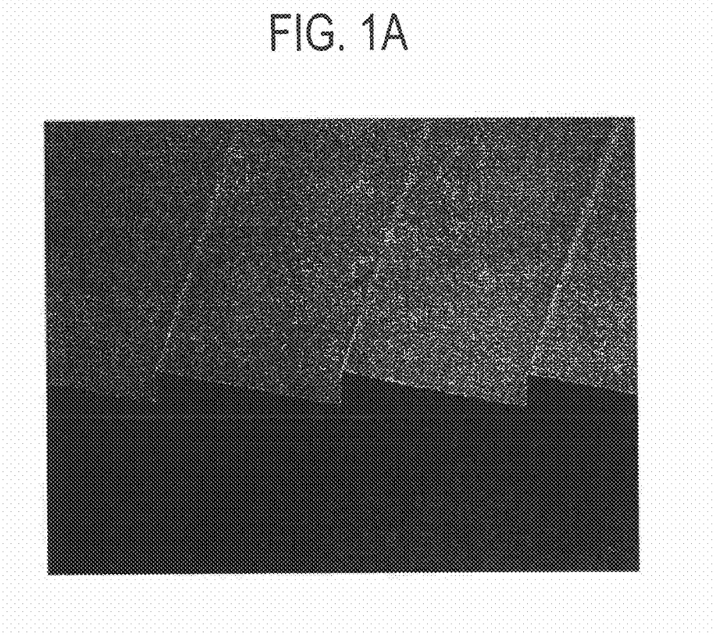
FIG. 1A is an image view showing a die surface including grooves each having a point angle of 80 degrees.
Figure 1B:
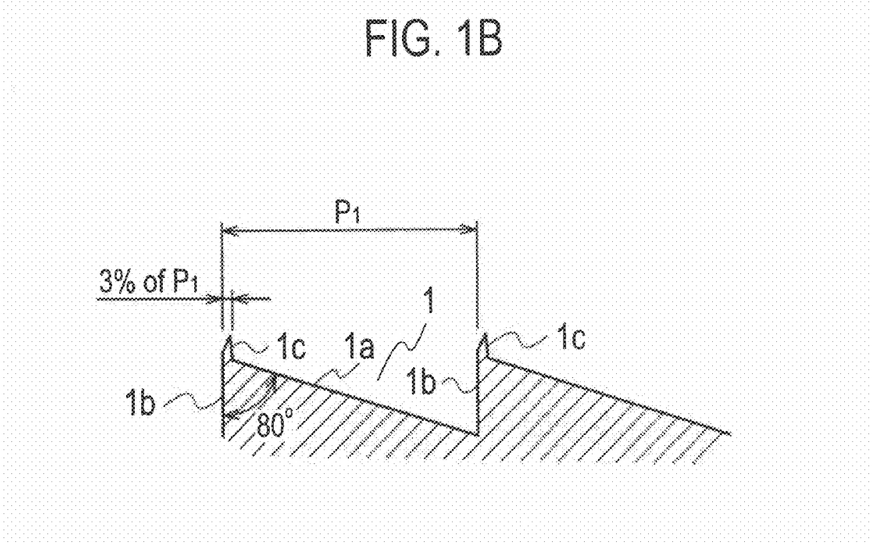
FIG. 1B is a schematic sectional view of the die surface of FIG. 1A.

In the figures, FIG. 1A is an image view showing a die surface including grooves each having a point angle of 80 degrees, while FIG. 1B is a schematic sectional view of the die surface of FIG. 1A.

In this example shown in FIGS. 1A and 1B, a groove 1 is defined by a slanted surface 1a and a side surface 1b. These surfaces 1a, 1b are provided by using a cutting tool having a point angle of 80 degrees. A burr 1c is produced at a point portion of the groove 1 in cutting the side surface 1b. In our measurement, the truth where the burr 1c has a width equivalent to about 3% of a pitch (or a distance between adjoining side surfaces) $P_1$ of the groove 1 did come out.

Figure 2A:
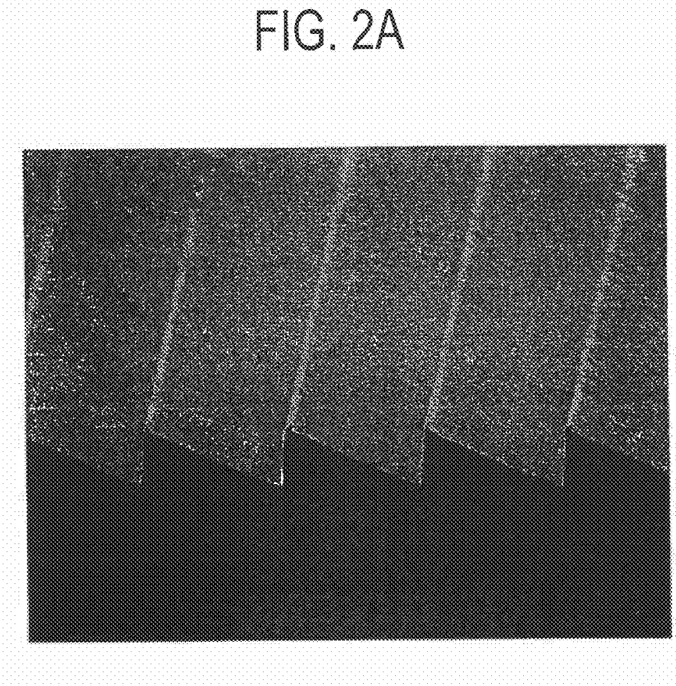
FIG. 2A is an image view showing a die surface including grooves each having a point angle of 70 degrees.
Figure 2B:
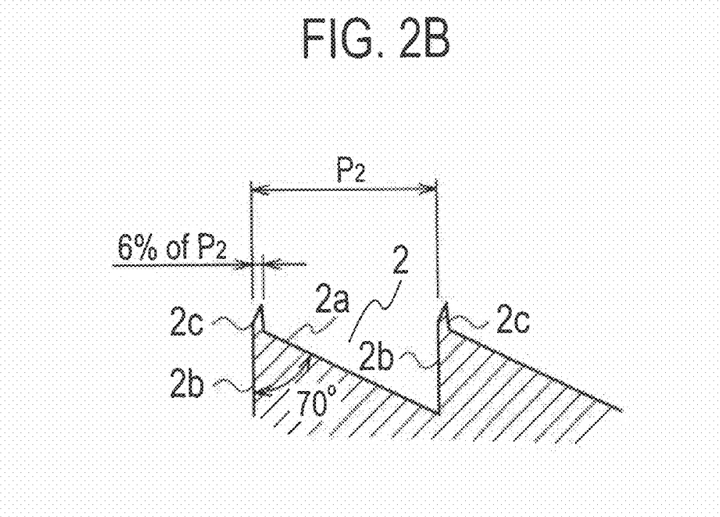
FIG. 2B is a schematic sectional view of the die surface of FIG. 2A.

FIG. 2A is an image view showing a die surface including grooves each having a point angle of 70 degrees, while FIG. 2B is a schematic sectional view of the die surface of FIG. 2A. In the example shown in FIGS. 2A and 2B, a groove 2 is also defined by a slanted surface 2a and a side surface 2b. These surfaces 2a, 2b are provided by using a cutting tool having a point angle of 70 degrees. A burr 2c is produced in processing these surfaces 2a, 2b by cutting. In our measurement, the truth where the burr 3c has a width equivalent to about 6% of a pitch (or a distance between adjoining side surfaces) $P_2$ of the groove 2 did come out.

Figure 3A:
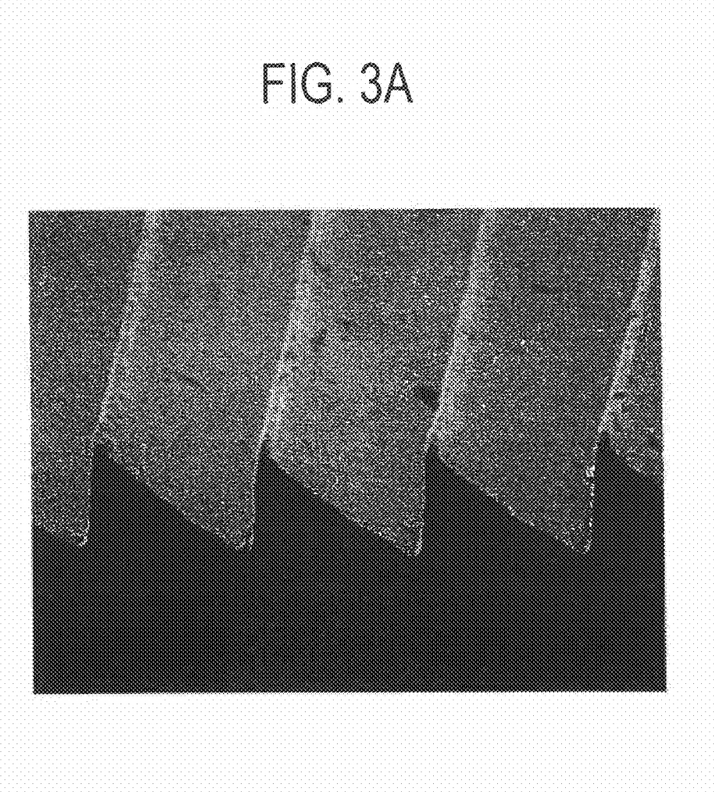
FIG. 3A is an image view showing a die surface including grooves each having a point angle of 60 degrees.
Figure 3B:
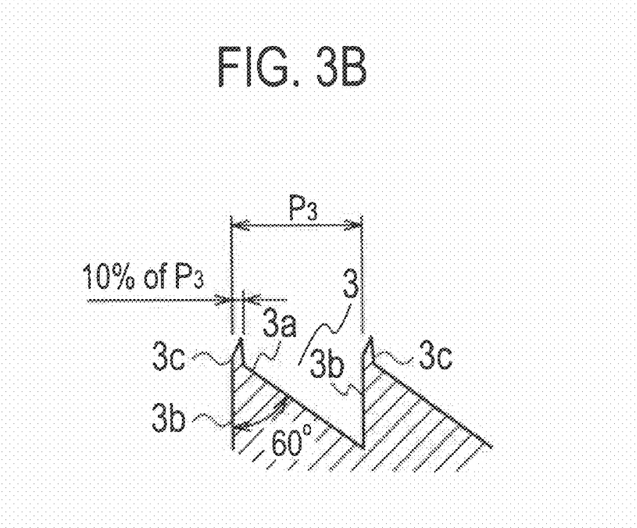
FIG. 3B is a schematic sectional view of the die surface of FIG. 3A.

FIG. 3A is an image view showing a die surface including grooves each having a point angle of 60 degrees, while FIG. 3B is a schematic sectional view of the die surface of FIG. 3A. In the example shown in FIGS. 3A and 3B, a groove 3 is also defined by a slanted surface 3a and a side surface 3b. These surfaces 3a, 3b are provided by using a cutting tool having a point angle of 60 degrees. A burr 3c is produced in processing these surfaces 3a, 3b by cutting. In our measurement, the truth where the burr 3c has a width equivalent to about 10% of a pitch (or a distance between adjoining side surfaces) $P_3$ of the groove 3 did come out.

Figure 4:
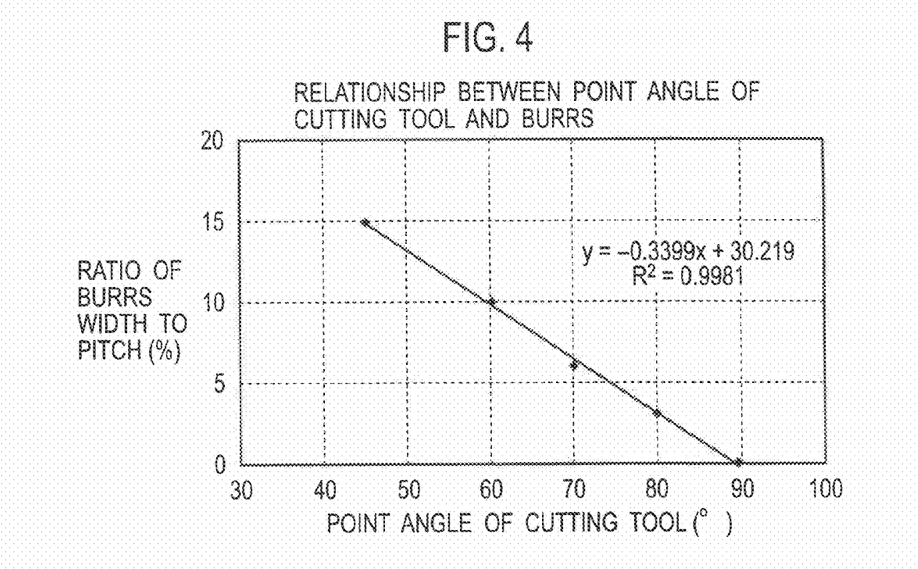
FIG. 4 is a view showing the relationship between point angles of a cutting tool and ratios of burrs width to pitch.
Figure 5:
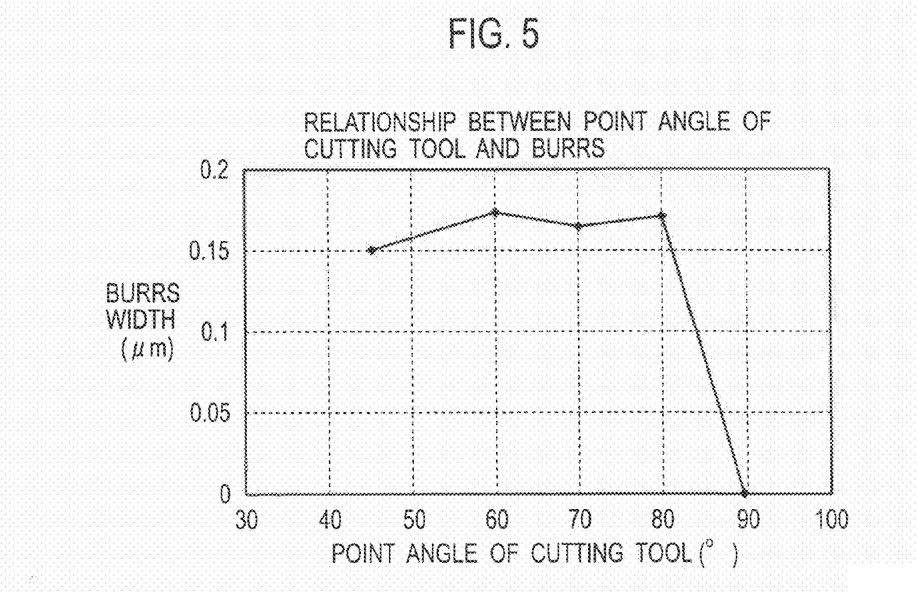
FIG. 5 is a view showing the relationship between point angles of the cutting tool and burrs widths.

FIG. 4 is a view showing the relationship between point angles of a cutting tool and ratios of burrs width to pitch, while FIG. 5 is a view showing the relationship between point angles of the cutting tool and burrs widths. Obviously from FIG. 4, the point angle of the cutting tool is in inverse proportion to the ratio of burr width to pitch. As shown in FIG. 5, when the point angle of the cutting tool is less than about 80 degrees, the burr width roughly ranges from 0.15 μm to 0.17 μm. Further, it will be understood that if the point angle of the cutting tool exceeds about 80 degrees, then the burr width has minute values.

It should be noted that the diffraction optical element produced with the use of a molding die having the above burrs has a reduced optical characteristics due to the occurrence of hazardous lights resulting from diffused reflection at the optical element's portions corresponding to the burrs.

We therefore put restraints on such a reduction in optical characteristics of the diffraction optical element by suppressing the occurrence of burrs in the molding die.

We now describe the method of manufacturing the molding die for a diffraction optical element in accordance with the embodiment of the present invention.

Figure 6:
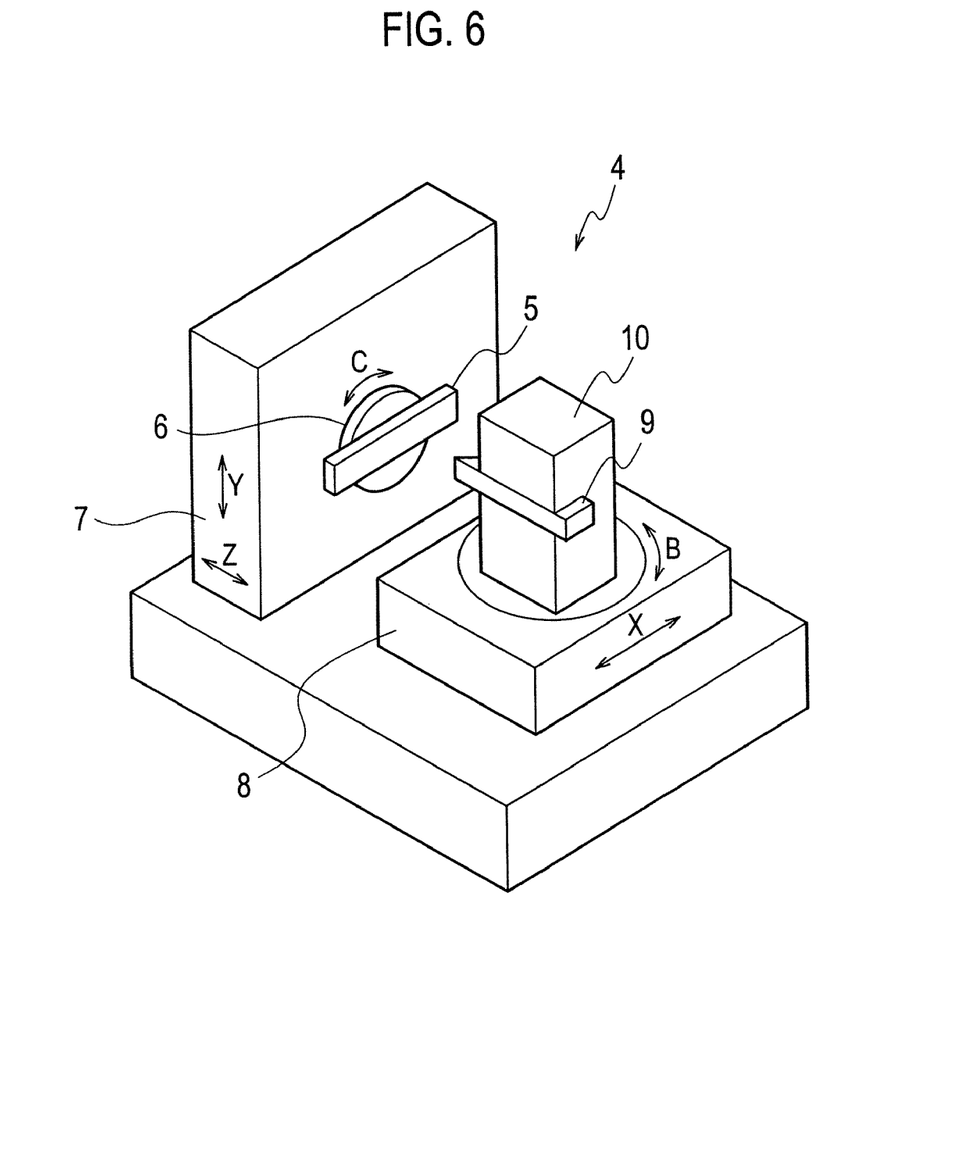
FIG. 6 is a perspective view showing a type of processing machine for producing a molding die for a diffraction optical element in accordance with an embodiment of the present invention.

FIG. 6 is a perspective view showing a type of processing machine for producing the molding die for a diffraction optical element in accordance with the embodiment of the present invention. The illustrated processing machine 4 comprises a rotating spindle 6 for rotatably holding a die material 5 as an object to be processed, a "YZ" stage 7 adapted so as to be movable in both directions shown with arrows Y and Z, an "X" stage movable in the direction of arrow X and a holder 10 mounted on the X stage 8 rotatably about an axis of the Y direction to hold a cutting tool 9. In the above-constructed processing machine 4, the cutting tool 9 operates to cut a surface of the die material 5 corresponding to diffraction gratings of the diffraction optical element while being rotated by the rotating spindle 6.

FIGS. 7A to 7E are schematic sectional views to explain the manufacturing process of the molding die for the diffraction optical element in accordance with the embodiment of the present invention. According to the embodiment, the die material 5 comprises a die base (or base material for molding die) made from appropriate steel for molding dies and an electroless nickel plating applied on the die base to form a processing layer in the die material 5. The die material 5 is formed with a flat surface as the surface to be processed.

Figure 7A:
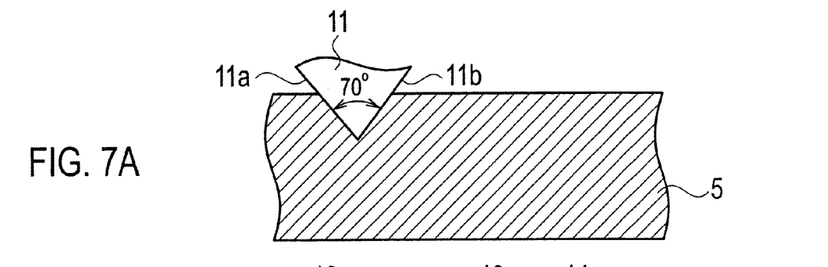
FIGS. 7A to 7E are schematic sectional views to explain the manufacturing process of the molding die for the diffraction optical element in accordance with the embodiment of the present invention.
Figure 7B:
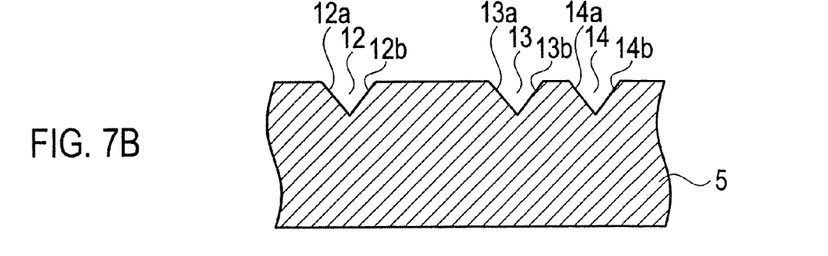
Figure 7C:
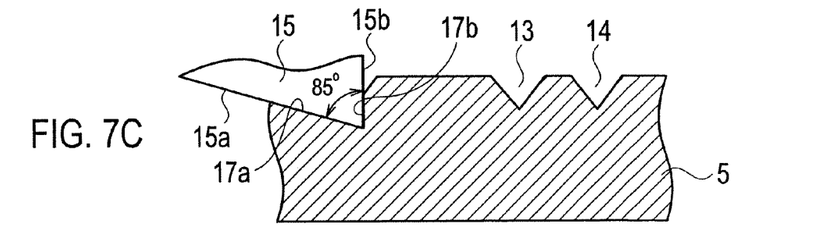

First, as shown in FIGS. 7A and 7B, a cutting tool 11 having a predetermined point angle, for example, 70 degrees is attached to the holder 10 in order to form a plurality of V-shaped grooves 12, 13, 14, . . . having V-shaped sections, at predetermined positions of the material 5. Then, in these V grooves 12, 13, 14, . . . , first slanted surfaces 12a, 13a, 14a, . . . are formed by a cutting edge 11a of the cutting tool 11, while second slanted surfaces 12b, 13b, 14b, . . . are formed by a cutting edge 11b of the cutting tool 11.

Next, using a cutting tool 15 having a point angle of 85 degrees (see FIG. 7C), it is cut in the second slanted surface 12b of the V-shaped groove 12 in a direction substantially perpendicular to the flat (top) surface of the die material 5 so as to leave an upper part of the second slanted surface 12b. In cutting, a cutting edge 15b of the cutting tool 15, which is formed so as to be substantially perpendicular to the flat top surface of the material 5, cuts in the material 5 thereby to form a groove 17 corresponding to one diffraction grating of the diffraction optical element, more particularly, a side surface 17b of the groove 17. In the groove 17, similarly, a slanted surface 17a extending from a lowermost end of the side surface 17b obliquely to the left in the figure (FIG. 7C) is provided by another cutting edge 15a of the cutting tool 15.

Next, using a cutting tool 16 having a point angle of 80 degrees (see FIG. 7D), it is cut in the second slanted surface 13b of the V-shaped groove 13 in a direction substantially perpendicular to the flat (top) surface of the die material 5 so as to leave an upper part of the second slanted surface 13b. In cutting, a cutting edge 16b of the cutting tool 16, which is formed so as to be substantially perpendicular to the flat top surface of the material 5, cuts in the material 5 thereby to form a groove 18 corresponding to another diffraction grating of the diffraction optical element, more particularly, a side surface 18b of the groove 18. In the groove 18, similarly, a slanted surface 18a extending from a lowermost end of the side surface 18b obliquely to the left in the figure (FIG. 7D) is provided by another cutting edge 16a of the cutting tool 16. Additionally, during cutting the slanted surface 18a, a top end of the second slanted surface 12b of the groove 12 is shaved by the cutting edge 16a, so that a chamfer surface 18c slanted to the slanted surface 18a is completed at a leading edge of the groove 18.

Figure 7D:
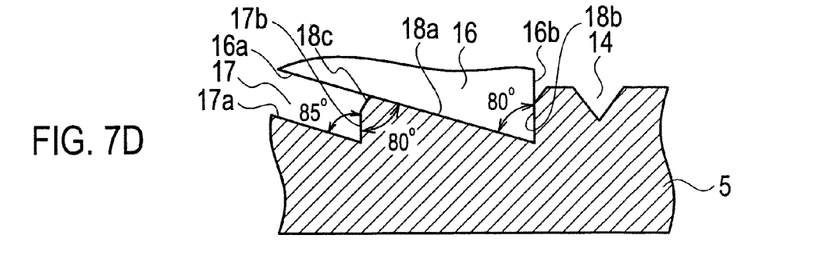
Figure 7E:
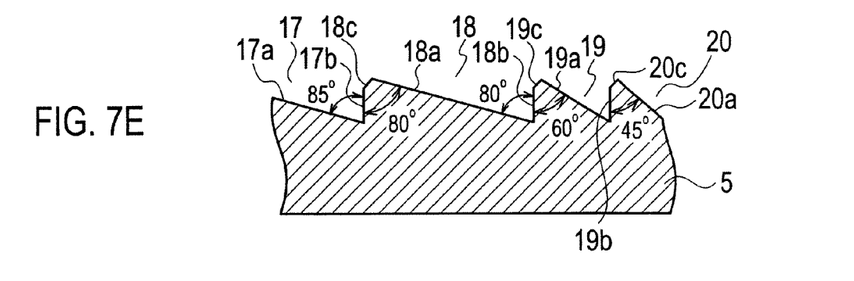

In the illustrate embodiment, as mentioned above, the cutting tool 16 cuts in the material 5 so as to form the slanted surface 18a and the side surface 18b simultaneously. Alternatively, it may be carried out to firstly form the side surface 18b with the use of a cutting tool having a point angle less than 80 degrees and successively form the slanted surface 18a with the use of a different cutting tool.

Thereafter, using cutting tools having various point angles, grooves 19, 20, . . . are formed in the same procedure as mentioned above. In the example shown in FIG. 7D, the groove 19 is formed by using a cutting tool having a point angle of 60 degrees, while the groove 10 is formed by using another cutting tool having a point angle of 45 degrees.

Figure 8:
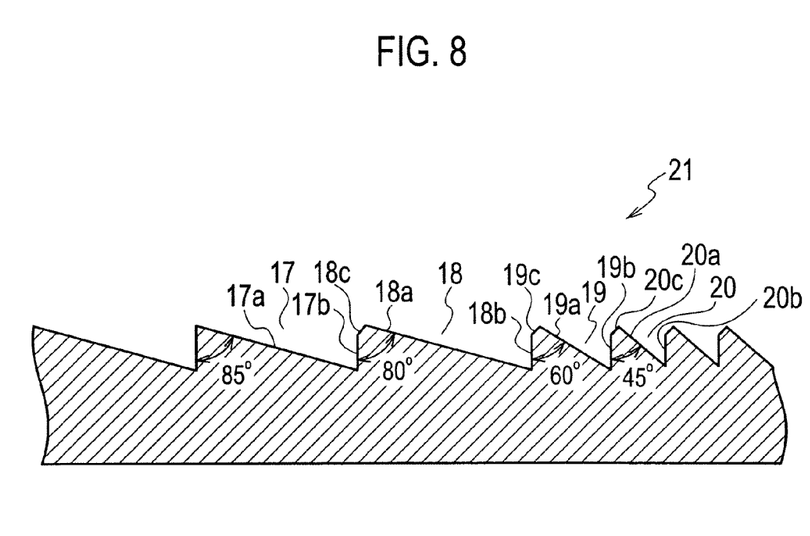
FIG. 8 is a sectional view of an essential part of the molding die for the diffraction optical element in accordance with the embodiment of the present invention.
Figure 9A:
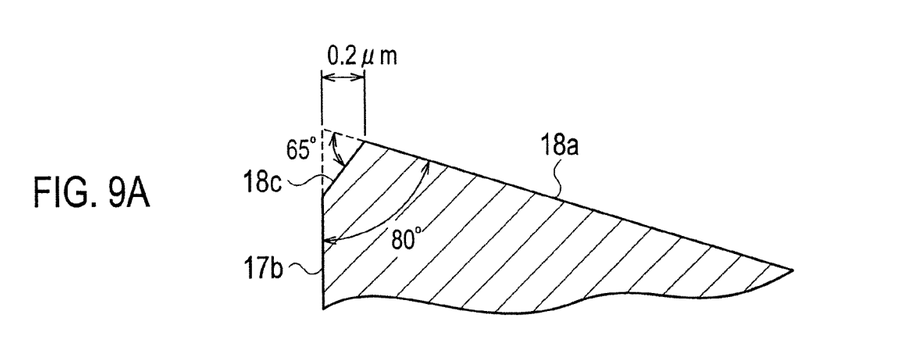
FIGS. 9A, 9B and 9C are sectional views showing respective points of grooves of the molding die for the diffraction optical element.
Figure 9B:
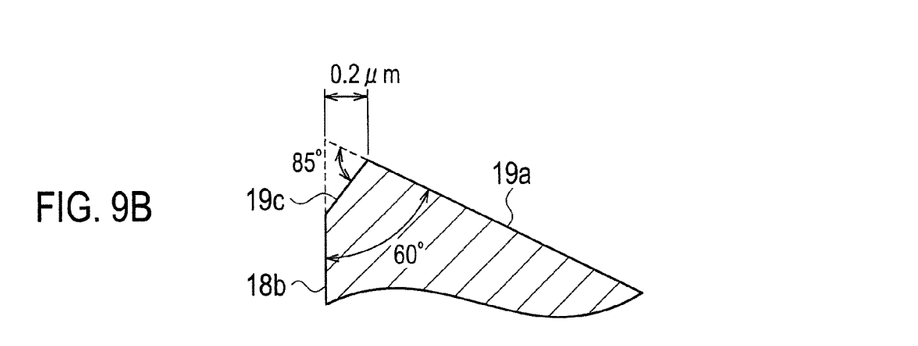
Figure 9C:
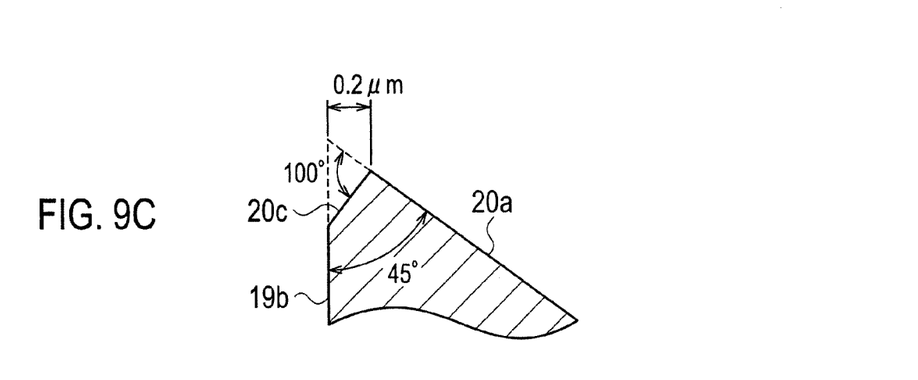

FIG. 8 is a sectional view of an essential part of the molding die for the diffraction optical element manufactured in accordance with the above-mentioned procedure. FIG. 9A is a sectional view showing a point of the groove 18 having a point angle of 80 degrees. FIG. 9B is a sectional view showing a point of the groove 19 having a point angle of 60 degrees. FIG. 9C is a sectional view showing a point of the groove 20 having a point angle of 45 degrees.

As shown in FIG. 8, a molding die 21 manufactured by the manufacturing method of the embodiment has chamfer surfaces 18c, 19c, 20c, . . . formed at respective points of the grooves 18, 19, 20, . . . corresponding to the diffraction gratings of the diffraction optical element in order to prevent the occurrence of burrs. Here, it is noted that if the point angle of the groove exceeds 80 degrees, then the burr width becomes minute. Therefore, no chamfer surface is formed at the point of the groove 17 whose point angle is 85 degrees while of the grooves 18, 19, 20, . . . are provided, at respective points thereof, with the chamfer surfaces 18c, 19c, 20c, . . .

From FIG. 5, it will be understood that the burrs produced at respective points of the grooves having point angles less than 80 degrees have respective burr widths ranging from 0.15 µm to 0.17 µm roughly. Therefore, as shown in FIGS. 9A, 9B and 9C, respective widths of the chamfer surfaces 18c, 19c, 20, . . . in the direction perpendicular to the side surfaces 17b, 18b, 19b, . . . are established to be 0.2 µm each. Note, in the example shown in FIGS. 9A, 9B and 9C, an inclination angle of the chamfer surface 18c to the slanted surface 18a is 65 degrees, an inclination angle of the chamfer surface 19c to the slanted surface 19a 85 degrees, and an inclination angle of the chamfer surface 20c to the slanted surface 20a is 100 degrees.

Figure 10:
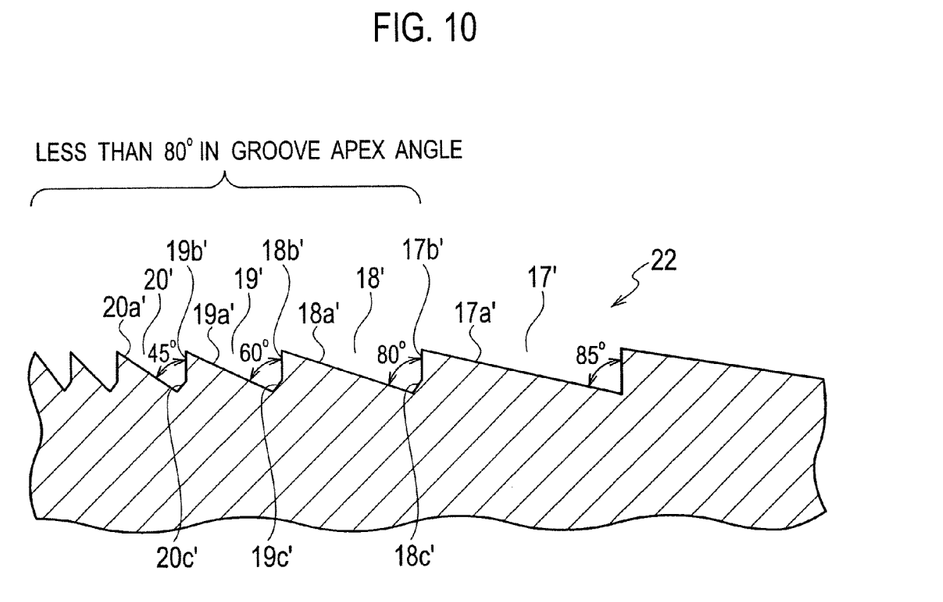
FIG. 10 is a sectional view of an essential part of a diffraction optical element molded by using the molding die of FIG. 8.

The diffraction optical element of the embodiment can be manufactured by molding plastic material with the use of the molding die 21 of FIG. 8. FIG. 10 is a sectional view of an essential part of the diffraction optical element 22 molded by using the molding die of FIG. 8.

As shown in FIG. 10, the diffraction optical element 22 is formed with diffraction gratings 17', 18' . . . which correspond to grooves 17, 18, . . . of the molding die 21, respectively.

The diffraction grating 18' whose groove apex angle between the slanted surface 18a' and the side surface 17b' of the diffraction grating 17' (i.e. an angle of the slanted surface 18a' with the side surface 18b') is 80 degrees, is provided, on the lower side of the slanted surface 18a', with a chamfer surface 18c' corresponding to the chamfer surface 18c of the molding die 21. Similarly, on the lower side of the slanted surfaces 19a', 20a', . . . of the diffraction gratings 19', 20', . . . each having a groove apex angle less than 80 degrees, chamfer surfaces 19c', 20c' . . . are formed to correspond to the chamfer surfaces 19c, 20c, . . . of the molding die 21, respectively. On the contrary, the diffraction gratings 17' having a groove apex angle of 85 degrees is formed with no chamfer surface.

The diffraction optical element 22 has a function of bending a transmission light path to a specified direction since respective phases of lights transmitted through the diffraction gratings 17', 18', . . . are changed to produce diffraction. Then, although incident lights on the chamfer surfaces 18c', 19c', . . . are deflected to other directions, there is produced no diffuse reflection.

It is noted that the diffraction optical element manufactured by the molding die having burrs shown in FIGS. 1 to 3 exhibits a reduced optical characteristics since the lights reflect at the element's parts corresponding to the burrs diffusely to produce harmful lights. On the contrary, in the diffraction optical element 22 of the embodiment, it is possible to reduce harmful lights and also possible to suppress the deterioration in optical characteristics since the occurrence of diffuse reflection is restrained.

Additionally, since the diffraction optical element 22 has some diffraction gratings whose groove apex angles exceed a predetermined angle (the embodiment: 80 degrees) provided with no chamfer surface commonly, it is possible to hold the deterioration in optical characteristics to a minimum.

Although the present invention has been described above by reference to one embodiment of the invention, this invention is not limited to this and modifications will occur to those skilled in the art, in light of the teachings. Furthermore, various inventions may be made by combining a plurality of constituents disclosed in the above-mentioned embodiment appropriately. For instance, some constituents may be eliminated from the overall constituents shown in the embodiment. The scope of the invention is defined with reference to the following claims.

What is claimed is:

1. A diffraction optical element comprising:
 a plurality of diffraction gratings formed to have a blazed profile in section, each of the diffraction gratings being defined by a slanted surface of one diffraction grating and a side surface of another diffraction grating adjacent to the diffraction grating, wherein in the diffraction gratings,
 at least one diffraction grating that an angle of a slanted surface of the at least one diffraction grating with a side surface of another diffraction grating adjacent to the at least one diffraction grating is less than a predetermined angle, is provided with a chamfer surface which is formed on the lower side of the slanted surface and also inclined to the slanted surface.

2. The diffraction optical element of claim 1, wherein the predetermined angle is substantially 80 degrees.

3. A molding die for molding a diffraction optical element having a plurality of diffraction gratings formed to have a blazed profile in section, the molding die comprising:
 a plurality of grooves formed to correspond to the diffraction gratings and also have a blazed profile in section, each of the grooves being defined by a slanted surface of one groove and a side surface of another groove adjacent to the one groove, wherein in the grooves,
 at least one groove that an angle of a slanted surface of the at least one groove with a side surface of another groove adjacent to the at least one groove is less than a predetermined angle, is provided with a chamfer surface which is formed on the upper side of the slanted surface and also inclined to the slanted surface.

4. The molding die of claim 3, wherein
the predetermined angle is substantially 80 degrees.

5. The molding die of claim 3, wherein
the chamfer surface is formed with a width in a direction perpendicular to the side surface, which is substantially equal to 0.2 µm.

6. A diffraction optical element manufactured with use of the molding die of claim 3.

7. A method of manufacturing a molding die for molding a diffraction optical element having a plurality of diffraction gratings formed to have a blazed profile in section, the molding die having a plurality of grooves formed to correspond to the diffraction gratings of the diffraction optical element and also have a blazed profile in section, the method comprising the steps of:
preparing a die material;
forming V-shaped grooves at predetermined positions on a surface of the die material, each of the V-shaped grooves having a V-shaped section;
cutting a lower side of one slanted surface defining each of the V-shaped grooves thereby to form a side surface of each of the grooves, which intersects with the one slanted surface of the V-shaped groove and which is substantially perpendicular to the surface of the die material; and
cutting in another slanted surface defining each of the V-shaped grooves thereby to form a slanted surface of each of the grooves, which intersects with the side surface and which extends in an opposite direction to the one slanted surface of the V-shaped groove intersecting with the side surface; wherein
in case of forming the groove that an angle of the side surface with the slanted surface is less than a predetermined angle,
the step of cutting in the other slanted surface to form the slanted surface including a step of shaving a top end of a slanted surface of another V-shaped groove adjoining the upper end of the slanted surface at thereby to form a chamfer surface intersecting with the slanted surface obliquely.

8. The method of claim 7, wherein the cutting step of forming the side surface of each of the grooves and the cutting step of forming the slanted surface of each of the grooves are simultaneously completed by using a single cutting tool.

* * * * *